May 24, 1966 W. C. PRIOR 3,252,346
MANUFACTURE OF VARIABLE SPEED PULLEYS AND THE LIKE
Original Filed July 22, 1963
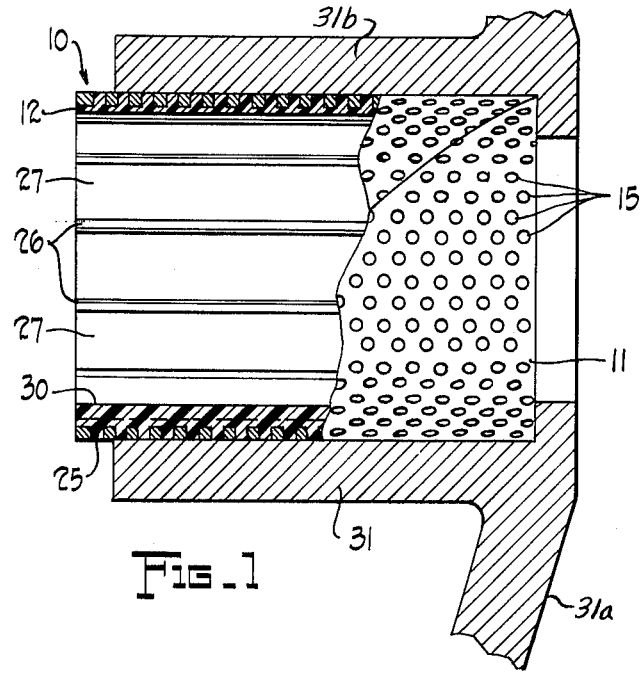
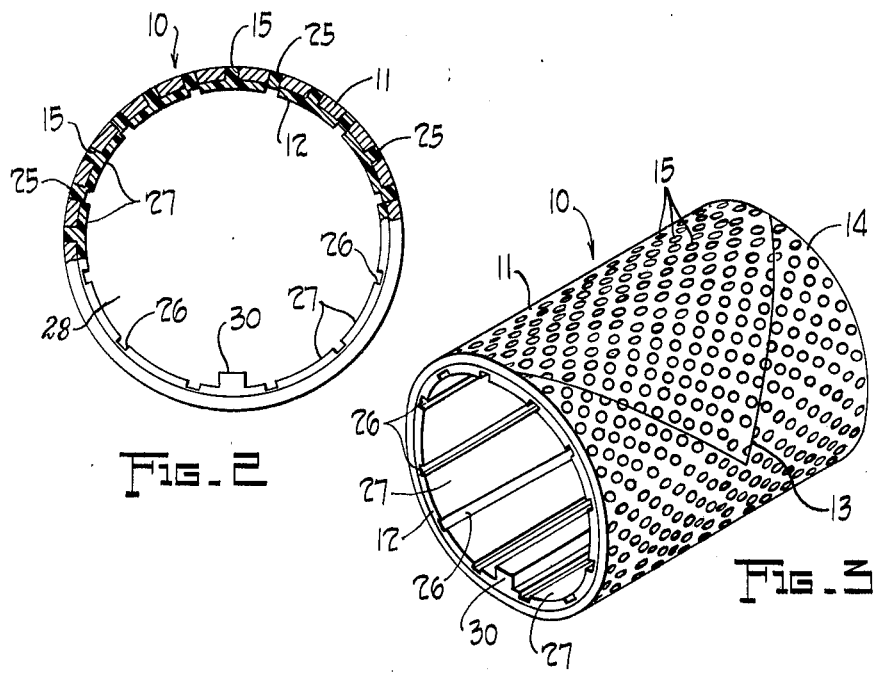
INVENTOR.
WILLIAM C. PRIOR
BY Watts & Fisher
ATTORNEYS.

3,252,346
MANUFACTURE OF VARIABLE SPEED PULLEYS AND THE LIKE
William C. Prior, Chagrin Falls, Ohio, assignor to Speed Selector, Inc.
Continuation of application Ser. No. 296,526, July 22, 1963. This application July 7, 1965, Ser. No. 472,400
11 Claims. (Cl. 74—230.16)

This application is a continuation of application Serial No. 296,526, filed July 22, 1963, in the name of William C. Prior.

This invention relates generally to drive mechanisms, and more specifically to new and useful improvements in the construction of axially adjustable pulleys of the type which may be mounted on a shaft by means of a spline or key.

Power drive mechanisms of the type having driving and driven pulleys operatively connected by a belt conventionally include pulley structures having adjustable diameters so that a variation in the speed ratios of the pulleys can be obtained. Usually, such a pulley structure has a pair of opposed cone discs or pulley halves which cooperate with a V-belt, the variation in effective pitch diameter being obtained by adjusting the axial spacing of the pulley halves on a shaft. Thus, by moving the pulley halves close together, the belt is caused to move radially outwardly along the conical faces of the pulley halves, thereby producing an increased pitch diameter. Conversely, when the pulley halves are drawn apart on the mounting shaft, the belt moves radially inwardly along the faces of the pulley halves to decrease the effective pitch diameter.

Adjustable pulleys of the construction generally described are usually provided with sleeve-type bearings for mounting the pulleys in axial sliding relation with the supporting shafts. In the past, it has been conventional to form such sleeve-type bearings of metal. Although metal sleeve bearings are still extensively employed, many difficulties are encountered with their use. In general, metal bearings exhibit relatively poor wear life, require periodic lubrication, and are subject to chemical corrosion. A more specific problem associated with the use of metal bearings is the occurrence of fretting corrosion which results in the metal progressively oxidizing. Since the oxides produced by fretting corrosion have a larger volume than the original metal, the conventional metal bearings eventually seize and bind on the shaft.

More recently, sleeve-type bearings have been made which utilize a suitable synthetic plastic material, such as nylon or Teflon. As has been recognized by others, synthetic plastics such as those mentioned are resistant to chemical attack, physical abrasion and fretting corrosion, and have natural lubricating characteristics and low frictional coefficients. However, prior to the present invention, plastic bearings also have had disadvantages which limited their use. These disadvantages are primarily due to the dimensional instability of the plastic bearing material under pressure and temperature change.

For example, it is almost impossible effectively to contain a one-piece, sleeve-type bearing. While the bearing can be mounted with a tight compression fit in the hub of the pulley, it undergoes serious dimensional changes due to the heat produced during use and normal changes in temperature and humidity conditions. It is also subject to cold flow due to high stresses imposed on the drive system. As a result, the solid one-piece bearing relatively quickly weakens and loses its compression fit. At the same time, the plastic bearing may either expand or shrink so that it binds on the shaft. The foregoing problems are accentuated in a pulley drive mechanism including a keyway so that the plastic bearing can be keyed on the shaft against rotation while permitting longitudinal movement of the bearing and pulley. Usually, the keyway has been milled in the bearing, and the plastic must be thick enough to accommodate its formation. Because of the thickness of the plastic, the dimensional changes encountered in use are particularly severe.

The composite metal and plastic bearing was devised as a means of overcoming the containment problems described above. This construction comprises a cylindrical metal sheath and an inner lining of synthetic plastic. While the metal and plastic bearing offers improvements over the solid, one-piece type, it has been difficult to produce because of the normal tendency of the plastic to shrink as it cools after the molding operation. As the plastic material cools, hoop stresses are developed and these stresses cause the lining to pull away from the sheath. During use, the stresses which are developed as the plastic material undergoes temperature changes also cause the lining to pull away from the sheath and bind on the shaft.

In order to prevent the plastic lining from separating from the sheath, it has been proposed to form a mechanical interlock between the two members. This has been done by providing the sheath with a multiplicity of openings which are formed in a manner designed mechanically to lock the plastic against shrinkage. This expedient has not been found wholly satisfactory, however. Moreover, the formation of the complex openings in the sheath makes the construction unduly expensive.

The present invention broadly contemplates an axially adjustable pulley provided with an improved, laminated bearing structure including one material having greater thermal expansion characteristics than the other, and particularly provides for improvements in the construction of sleeve-type, metal and plastic bearings which overcome the problems previously discussed.

As will hereinafter be described, the preferred bearing construction provided by this invention is characterized by a lining of synthetic plastic which is molded within a backing member and includes spaced zones of reduced thickness longitudinally extending between the ends of the bearing. In the preferred embodiment, the backing member is an open-end metal sheath having perforations in which are molded integral portions of the lining, and the zones of reduced thickness are formed by slots molded through the inner surface of the lining.

The provision of longitudinally extending zones of reduced thickness in the lining makes it possible successfully to mold the synthetic plastic in intimate association with the sheath. This is because the zones prevent significant hoop stresses from developing in the plastic as it cools following the molding operation. Consequently, the plastic lining is prevented from shrinking away from the sheath to destroy the coherency of the new bearing structure. In a similar manner, the normal tendency of the plastic to change size during use because of changes in temperature and humidity and/or because of high stresses is minimized so that the bearing of this invention will maintain its original dimensions more accurately than conventional structures.

The present invention also contemplates a plastic bearing such as described which includes a key molded as an integral part of the lining. As distinguished from conventional bearings in which the plastic was required to be thick enough to permit the formation of a keyway, the lining of the new bearing can be relatively thin. The thinness of this lining minimizes heat concentration and overall dimensional changes in use because of varying temperature and humidity conditions.

Additional advantages of the plastic bearing provided by this invention include good wear life, natural lubricity, resistance to abrasion and chemical attack, and its low cost of manufacture.

Other advantages and a more complete understanding of the invention will be had by reference to the following detailed description and the accompanying drawing.

In the drawing:

FIGURE 1 is a view illustrating a section of an axially adjustable pulley including the bearing of this invention, the bearing being partially shown in cross-section and partially in elevation;

FIGURE 2 is an end elevation of the bearing construction shown partially in cross-section; and, FIGURE 3 is a perspective view of the bearing.

Referring now to the drawing, reference numeral 31 designates one half of a typical, variable pitch pulley which is adapted to be mounted in axial sliding relation on a shaft (not shown). The pulley half 31 has a conical belt-engaging surface 31a and a sleeve-like hub portion 31b. It will be understood that the pulley half 31 cooperates with an opposed cone disc or pulley half (also not shown), which may be either fixed to the shaft or axially slidable thereon, to drivingly engage the sides of a suitable V-belt. By axially sliding one or both of the pulley halves on the supporting shaft to move the pulley halves toward and away from each other, the effective pitch diameter of the pulley can be changed to obtain the desired speed.

In accordance with this invention, an improved sleeve bearing 10 is mounted in the hub portion 31b of the pulley half 31 so as to key the pulley half against rotation relative to the shaft while permitting axial sliding movement. The bearing 10 includes a sheath 11 and an inner plastic lining 12 which is in intimate contact with the inner surface of the sheath.

The sheath 11 is shown as being of generally cylindrical shape and as having open ends so that the shaft can be inserted through the bearing in the usual manner. According to the preferred construction, the sheath 11 is rolled from a perforated metal strip having a V-shaped end 13 which is mated in a cooperating notch formed in the other end 14. The ends of the strip are held together by the subsequently molded lining 12. With this preferred construction, the total force tending to separate or compress the ends of the strip is distributed along a parting line longer than the bearing itself, thereby resulting in a stronger joint than if the mating ends were axially extending. Concomitantly, the oblique parting line extends across a larger amount of plastic material which is advantageous in the bearing provided by this invention wherein the plastic lining is relatively thin and has zones of reduced thickness. According to another construction contemplated by this invention, the sheath 11 can be cut from tubular stock and provided with a multiplicity of small openings through its wall.

The bearing lining 12 is preferably substantially rigid and non-yieldable and may be formed of any synthetic plastic material, such as nylon, an acetal resin derived by polymerization of formaldehyde and sold under the trademark "Derlin," or the like, which is suitable for bearing usage and possesses such characteristics as low frictional resistance, and resistance to chemical action and physical abrasion. If desired, the selected resin may be combined with a tetrafluoroethylene fluorocarbon resin (Teflon) to increase its bearing properties and provide improved lubricity. One particular bearing material composition which has been used successfully consists essentially of Delrin and approximately 22% to 25% chopped Teflon fibers. The thickness of the lining 12 can be made to suit the size of the bearing and the operating conditions of the pulley. However, one feature of the invention generally described above is that the lining can be made relatively thin as compared to prior art plastic bearing structures. By way of example, a pulley bearing having an outer diameter of approximately 1¾ of an inch may be formed with a plastic lining having a thickness in the range of from about .02 to about .030 of an inch.

The plastic material forming the lining 12 is preferably injection molded in the sheath 11 in intimate contact with its inner surface. To this end, the metal strip forming the sheath 11 is rolled into the illustrated cylindrical form and placed in the die of a conventional injection molding machine. In the molding operation, the plastic material is extruded into the perforations 15 of the sheath to form portions 25 integral with the lining 12.

Further, in accordance with this invention, the lining 12 is molded to include spaced zones 26 of reduced thickness which extends longitudinally of the bearing, preferably, from one end to the other. These zones 26 of reduced thickness will be seen to define bearing lands 27 which are uniformly spaced around the inside of the bearing 10 and extend between its ends. The several lands 27 have inner surfaces which define a shaft opening 28 and are contoured to provide surface bearing contact with the shaft received through the opening. In the illustrated form of the invention, the zones 26 constitute slots or notches which are formed through the inner surface of the substantially rigid and non-yieldable lining 12. The slots or notches may terminate short of the inner surface of the sheath 11 as shown or they may extend completely through to the backing member or sheath. The width of the slots or notches can vary widely and may, for example, be on the order of from .020 to .030 of an inch or smaller.

As generally described above, the spaced zones 26 of reduced thickness are effective to disrupt and thereby minimize hoop stresses in the bearing lining 12. Consequently, the lining 12, which is formed of synthetic plastic normally characterized by dimensional instability under pressure and temperature change, is prevented from shrinking away from the sheath as the plastic material cools following the molding operation. The width and depth of the slots also is made sufficient to minimize overall dimensional changes of the lining during use of the pulley because of varying temperature and humidity conditions, whereby the lining will retain its original dimensions. Thus, the molding of the lining 12 so as to include the zones 26 makes it possible successfully to apply a synthetic plastic to the sheath and produce a coherent metal and plastic bearing structure for a pulley. In addition, the zones 26 and the cooperating interlock between the lining portions 25 and the perforations 15 aid in preventing warpage of the plastic lining 12. If desired, the invention contemplates forming the bearing 10 with a longitudinally extending key 30 which is molded as an integral part of the lining 12. Thus, when the bearing 10 is assembled within the pulley hub 31b, the key 30 can be mated in a cooperating keyway of the shaft received through the opening 28 so as to key the pulley half 31 against rotation relative to the shaft while permitting axial sliding movement. This provision of the key 30 makes it possible to mold the lining thinner than if it were to accommodate the formation of a keyway, such as in conventional constructions. Moreover, the thinner lining minimizes heat concentration in use and total dimensional changes due to normal changes in temperature and humidity.

Among other advantages, it will be apparent from the foregoing that this invention makes it possible to provide a variable pitch pulley with a plastic bearing without the disadvantages attendant to conventional bearing structures. More specifically, the invention provides for the sucessful manufacture of sleeve-type metal and plastic bearings in a manner which achieves a coherent structure and prevents the molded plastic from shrinking away from the metal as the plastic cools following the molding operation. At the same time, these advantages are obtained by a relatively inexpensive construction and process of manufacture.

Many modifications and variations of the invention will be apparent to those skilled in the art in the light of the foregoing detailed disclosure. Therefore, it is to be understood that, within the scope of the appended claims, the invention can be practiced otherwise than as specifically shown and described.

What is claimed is:

1. A variable pitch pulley including a pulley half adapted to be mounted for axial sliding movement on a shaft and including a hub portion, the improvement comprising a sleeve bearing fitted within said hub portion, said bearing including a sheath and a plastic lining intimately united with the inner surface of said sheath, said lining including circumferentially spaced zones of reduced thickness extending axially of said hub portion, said zones being of a size and number sufficient to minimize stresses and consequent dimensional instability of said lining due to temperature and pressure change so that said lining is prevented from separating from said sheath, and bearing lands between said zones, said lands having inner surfaces which define a shaft opening and provide bearing contact for a shaft received through said opening.

2. In a variable pitch pulley including a pulley half adapted to be mounted for axial sliding movement on a shaft and including a hub portion, the improvement comprising a sleeve bearing fitted within said hub portion, said bearing including a tubular sheath and a lining of substantially rigid and non-yieldable bearing material intimately united with the inner surface of said sheath, said bearing material being normally characterized by dimensional instability under pressure and temperature change, said bearing material being formed with circumferentially spaced, longitudinally extending zones of reduced thickness effective to minimize hoop stresses and dimensional changes of said bearing material so that it is prevented from separating from said sheath, and bearing lands between said zones, said lands having inner surfaces which define a shaft opening and are contoured to provide bearing contact for a shaft received through said opening.

3. The improvement as claimed in claim 2 wherein, said zones of reduced thickness are formed by slots extending substantially through said lining to said sheath.

4. In a variable pitch pulley including a pulley half adapted to be mounted for axial sliding movement on a shaft and including a hub portion, the improvement comprising a sleeve bearing fitted within said hub portion, said bearing including a circumferentially continuous, cylindrical metal sheath, and a substantially rigid, non-yieldable bearing lining formed within said sheath to provide a unitary bearing structure, said lining being formed of plastic and having a higher rate of thermal expansion than said sheath, said lining being formed to include circumferentially spaced, longitudinally extending lands, said lands having inner faces contoured to define a shaft opening of fixed diameter and to provide surface bearing contact for said pulley half on a shaft, and said lands being defined by slots extending substantially through said lining to said sheath, the portions of said lining between said lands being sufficiently thin that stresses induced by pressure and temperature change are eliminated to the extent that said lining is prevented from separating from said sheath, and the width of said slots being sufficient to permit expansion of said lining material within said sheath without disrupting said unitary bearing structure.

5. The improvement as claimed in claim 4 wherein said lands extend from one end of said bearing to the other.

6. The improvement as claimed in claim 4 including a key formed as an integral part of one of said lands.

7. A method of fabricating a variable pitch pulley including a pulley half adapted to be mounted for axial sliding movement on a shaft, said method comprising the steps of providing a cylindrical metal sheath, molding a synthetic resin within said sheath to form a lining, said molding step including forming a plurality of circumferentially spaced, longitudinally extending slots in said lining, said slots being formed to have a size sufficient that stresses in said lining are minimized as the synthetic resin cools following the molding step and said lining is thereby prevented from separating from said sheath, and thereafter fitting said sheath in said pulley half.

8. A method of fabricating a variable pitch pulley including a pulley half adapted to be mounted for axial sliding movement on a shaft, said method comprising the steps of providing a tubular metal sheath, molding a synthetic resin at an elevated temperature to form a substantially rigid, non-yieldable lining intimately united with the inner surface of said sheath, said molding step including forming a plurality of longitudinally extending, circumferentially spaced slots through the inner surface of said lining so as to provide zones of reduced lining thickness, said slots defining longitudinally extending lands and being of a size and number sufficient to disrupt stresses in said lining induced by pressure and temperature change to such an extent that it will not shrink away from said sheath when cooled following the molding step and when said pulley is used, and thereafter fitting said sheath within said pulley half.

9. The method as claimed in claim 8 wherein said molding step further includes forming said lands to have inner faces contoured to define a shaft opening of fixed diameter and provide bearing surface contact for said pulley on a shaft.

10. In a method of fabricating a variable pitch pulley or the like adapted to be mounted for axial sliding movement on a shaft, the improvement comprising forming a bearing member by the steps of providing a circumferentially continuous rigid metal sheath, and molding a synthetic resin at an elevated temperature within said sheath while maintaining it in continuous tubular form to produce a substantially rigid, non-yieldable bearing lining intimately united with the inner surface of said sheath, said molding operation including forming a plurality of longitudinally extending, circumferentially spaced slots through the inner surface of said lining so as to provide zones of reduced lining thickness extending from one end of said sheath to the other, said slots defining longitudinally extending lands and being of a number and size sufficient to disrupt stresses in said lining induced by pressure and temperature change to the extent that said lining is prevented from separating from said sheath when cooled following the molding operation, said slots being formed with a width sufficient to permit expansion of said lining within said sheath without disrupting the unitary association of said sheath and lining, and said lands being formed to have inner surfaces contoured to define a shaft opening of fixed diameter and to provide surface bearing contact on a shaft received through said opening.

11. The method as claimed in claim 10 wherein said molding operation further includes molding a longitudinally extending key as an integral part of one of said lands.

No references cited.

DON A. WAITE, *Primary Examiner.*